United States Patent [19]

Schmidt

[11] 4,043,725

[45] Aug. 23, 1977

[54] APPARATUS FOR MOLDING PNEUMATIC VEHICULAR TIRES

[76] Inventor: Oskar Schmidt, Kittsee, Austria

[21] Appl. No.: 728,036

[22] Filed: Sept. 30, 1976

[30] Foreign Application Priority Data

Oct. 3, 1975 Austria .................................. 7571/75

[51] Int. Cl.² .......................... B29F 1/00; B29C 6/00; B29H 5/02; B29H 5/08

[52] U.S. Cl. ................................ 425/542; 425/34 R; 425/129 R; 425/130; 425/134; 425/46; 425/47; 425/39

[58] Field of Search ........................ 425/17, 18, 20, 19, 425/21, 22, 23, 24, 25, 31, 32, 34, 35, 38, 36, 39, 43, 46, 47, 53, 130, 134, 142 R, 129; 264/328

[56] References Cited

U.S. PATENT DOCUMENTS

| | | | |
|---|---|---|---|
| 1,101,732 | 6/1914 | Doughty | 425/40 |
| 1,132,250 | 3/1915 | Finlayson | 425/38 |
| 1,179,898 | 4/1916 | Coffey et al. | 425/47 |
| 1,388,255 | 8/1921 | Haldeman | 425/35 |
| 2,672,914 | 3/1954 | Weigold et al. | 425/32 X |
| 2,724,425 | 11/1955 | Ostling | 264/328 X |
| 3,276,930 | 10/1966 | Keefe | 425/43 X |
| 3,553,778 | 1/1971 | Woodhall | 425/36 |
| 3,609,813 | 10/1971 | MacMillan | 425/19 |
| 3,833,323 | 9/1974 | Pasch | 425/47 |
| 3,868,203 | 2/1975 | Turk | 425/242 |
| 3,914,081 | 10/1975 | Aoki | 425/130 |

FOREIGN PATENT DOCUMENTS

| | | | |
|---|---|---|---|
| 1,239,461 | 4/1967 | Germany | 425/46 |
| 45-30,590 | 10/1970 | Japan | 425/129 R |

*Primary Examiner*—J. Howard Flint, Jr.
*Attorney, Agent, or Firm*—Karl F. Ross; Herbert Dubno

[57] ABSTRACT

A mold cavity for producing a pneumatic vehicular tire is radially expandable to form successive coaxial annular layers, e.g. carcass, reinforcing belt and tread, of the tire body. The mold cavity is defined by a stationary core, several outer annular mold walls alternately juxtaposable with the core, and a pair of opposite cheeks axially bracketing the core and the juxtaposed segments. The segments of each mold wall are movably mounted on a respective carrier ring and are radially outwardly retractable thereon to clear the cheeks whereby they can be axially moved into and out of alignment with the core. With successive operative positioning of segment sets of progressively increasing inner radii around the core, the mold cavity is expanded after each molding step preparatorily to formation of the next layer after partial hardening of the elastomeric material of the layer previously formed therein.

10 Claims, 2 Drawing Figures

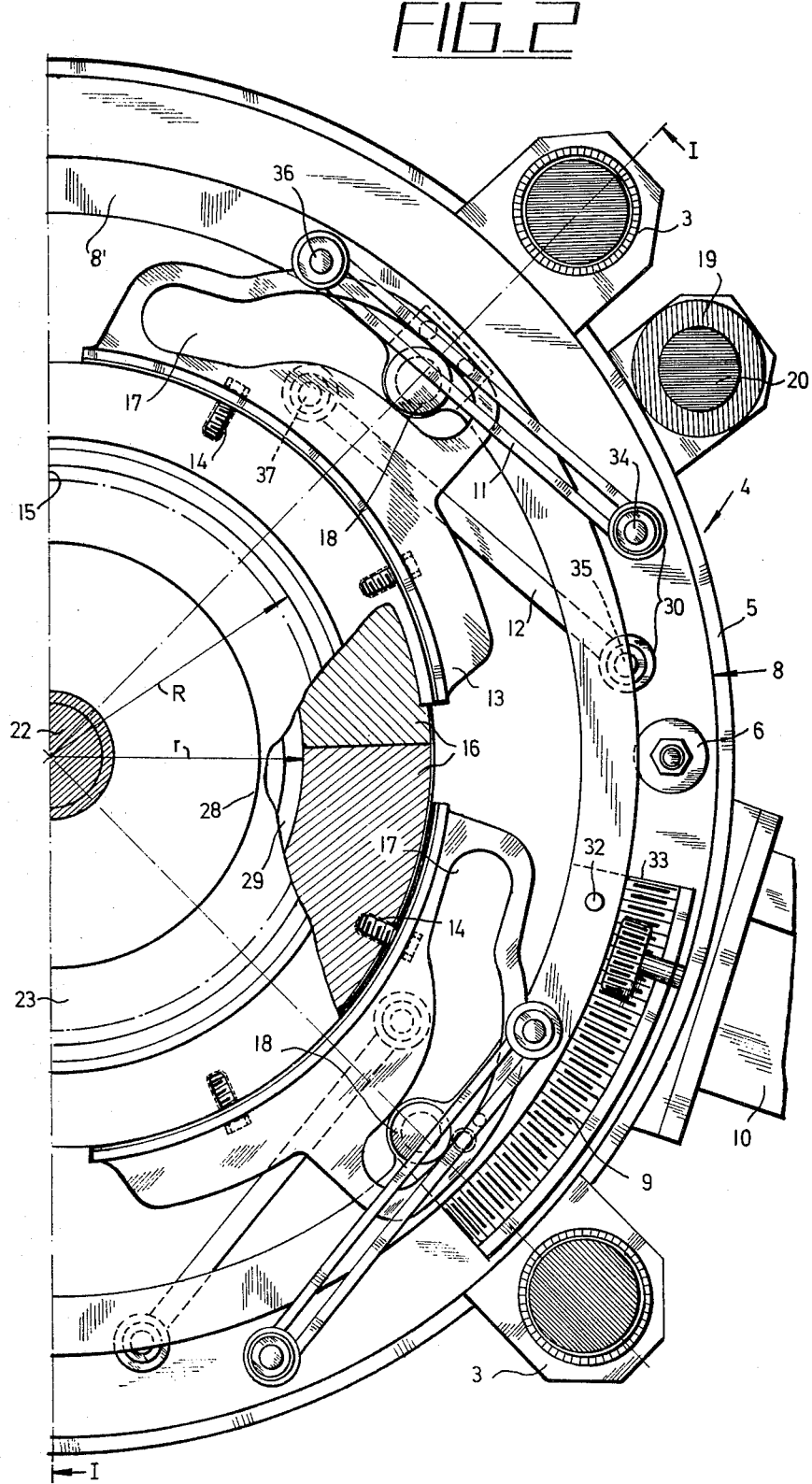

APPARATUS FOR MOLDING PNEUMATIC VEHICULAR TIRES

FIELD OF THE INVENTION

The present invention relates to an apparatus for molding a so-called radial pneumatic tire having a body formed from a plurality of coaxial annular layers of elastomeric material.

BACKGROUND OF THE INVENTION

In commonly owned U.S. patent application Ser. No. 669,666, filed 23 Mar. 1976,, there has been disclosed a tire mold with a generally toroidal core divided into segments which can be retracted radially inwardly to facilitate the separation of the core from the molded tire. The mold cavity is completed by a pair of half-shells whose separation in an axial direction enables the inward withdrawal of the core segments.

With the aid of suitable annular inserts, such a mold could be used in forming a composite tire body of the aforementioned radial type by producing successive layers in the same mold cavity whose effective width is progressively expanded through the removal of certain inserts between consecutive molding operations. This procedure, however, is cumbersome and time-consuming.

OBJECT OF THE INVENTION

It is, therefore, the object of the present invention to provide an improved apparatus of the expandable-mold type which simplifies the production of vehicular tires of the character set forth.

SUMMARY OF THE INVENTION

This object is realized, in accordance with the present invention, by the provision of a preferably upright frame carrying a generally toroidal core and a plurality of sets of mutually complementary ring segments coaxially juxtaposable with the core to define therewith an annular mold cavity, the ring segments of the several sets having different inner radii all larger than the core radius. The ring segments of each set are mounted with freedom of radial displacement on a respective carrier so as to be successively alignable with the core in the order of their increasing inner radii. Upon such alignment, and inward movement of the segments with the aid of suitable actuating means, the mold cavity is sealed against the outside by closure means on the frame preparatorily to the admission of elastomeric material into same.

The closure means advantageously comprise a pair of axially separated cheeks on opposite sides of the core, i.e. above and below that core in the preferred arrangement in which the core axis is vertical. The cheeks are generally disk-shaped with peripheral portions overlying the ring segments in their working position, i.e. when these segments complement one another to form a continuous outer mold wall around the core, but are cleared by the segments in their retracted position whereby the segment carriers can be axially shifted with reference to the cheeks for displacement therepast into and out of alignment with the core. Thus, two or more annular segment carriers can be stacked on the frame for successive operative juxtaposition with the stationary core. It should be understood, however, that the segments could be standing still and the core could be successively aligned therewith together with its pair of flanking cheeks.

BRIEF DESCRIPTION OF THE DRAWING

The above and other features of the invention will now be described in detail with reference to the accompanying drawing in which:

FIG. 2 is a cross-sectional view taken for the most part on the line II—II of FIG. 1.

SPECIFIC DESCRIPTION

Figure 1:
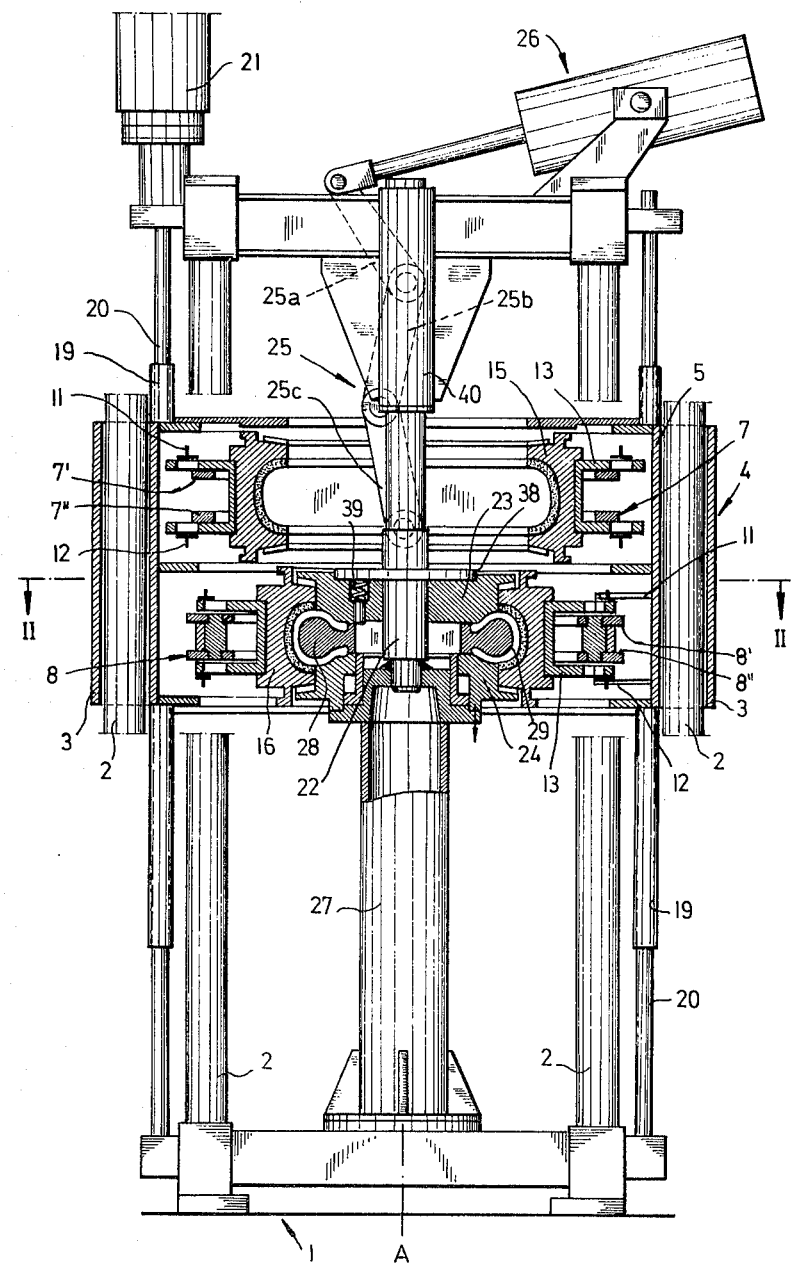
FIG. 1 is an elevational view, partly in section on the line I—I of FIG. 2, of a tire-molding apparatus embodying the invention.

The apparatus shown in the drawing comprises an upright frame 1 with several columns 2 angularly equispaced about a vertical axis A. Vertically slidable along this frame, with the aid of guide sleeves 3 traversed by the columns 2, is a mold-supporting unit 4 comprising a ring 5 centered on axis A. Peripherally spaced rollers 6 (only one shown) on ring 5 have upper and lower peripheral grooves receiving respective flanges 7', 7" and 8', 8" of two vertically spaced carrier rings 7 and 8, these flanges being interconnected by vertical bolts 32 as indicated for the ring 8 in FIG. 2. The two rings are thereby held centered on axis A with freedom of limited rotation therearound, under the control of respective electric motors 10 (only one shown) having pinions 33 which mesh with rack segments 9 on these rings.

Each ring 7, 8 carries a respective set of annular mold segments 15 and 16 in a manner which is the same for both rings and which therefore will be described only with reference to the lower ring 8 and the corresponding segments 16 visible in FIG. 2. An arcuate shoe 13, fastened by screws 14 to each segment 16, is connected with nonrotatable ring 5 and rotatable ring 8 via a parallelogrammatical linkage, generally designated 30, comprising a pair of arms 11, 12 articulated to rings 5, 8 at 34, 35 and to shoe 13 at 36, 37. This linkage enables the shoe to be moved radially, parallel to itself, together with the associated mold segment between an outwardly retracted position (in which the segments are separated by peripheral gaps) and the working position shown in FIG. 2 in which the segments complement one another to a continuous ring constituting the outer wall of a mold cavity 29. The inner boundary of that cavity is formed by a stationary core 28 of generally toroidal configuration. In order to facilitate the extraction of the core from the tire to be molded around it in cavity 29, the core may be of conventional collapsible type or may be split into inwardly retractable segments as described in the above-identified copending application Ser. No. 669, 666.

Each shoe 13 has a camming slot 17 receiving a roller 18 carried by the ring 8 (or 7 in the case of mold segments 15). Energization of motor 10 to rotate the ring 8 counterclockwise, as viewed in FIG. 2, moves all the segments 16 radially outwardly into their retracted or inoperative position as illustrated in FIG. 1 for segments 15. For the sake of comparison, FIG. 2 shows in phantom lines a part of the inner peripheries of segments 15 in their working position from which it will be noted that their inner radii R are larger than the inner radii r of segments 16; both radii exceed the outer radius of core 28 as will be apparent from FIG. 1.

Mounting ring 5 is provided with several elongate vertical nuts 19 in engagement with respective leadscrews 20 journaled on the frame 1, these leadscrews being driven in unison by a reversible motor 21 via a chain 31. Thus, energization of motor 2 raises or lowers the mold unit 4 with reference to the stationary core 28 which is supported on a central post 27 rising from the base of frame 1. Post 27 supports a lower cheek 24, rigid with the overlying core 28, and acts as a counterbearing for a vertically movable mandrel 22 which slides in a guide sleeve 40 on frame 1 and traverses an upper cheek 23. Core 28 is bracketed between these two disk-shaped cheeks whose peripheral zones overlie the segments 15 or 16 in their working positions but are cleared by these segments in their retracted positions. An articulated linkage 25, controlled by a hydraulic or pneumatic jack 26, acts through a collar 38 upon the upper cheeck 23 which is biased upwardly, with reference to core 28, by compression springs 39 (only one shown). The peripheral zones of cheeks 23, 24 have outwardly diverging confronting faces which facilitate the insertion of the mold segments 15 or 16 therebetween. Upon such insertion, by energization of motor 10 to establish the working position of FIG. 2, actuation of jack 26 closes the mold cavity 29 against the outside and allows it to be filled with an elastomeric material such as polyurethane. Carrier rings 7 and 8 are limitedly vertically movable, with their segmented mold walls 15 and 16, to allow the segments to be properly centered between the closing cheeks 23, 24. Linkage 25 comprises a two-arm lever 25a, 25b fulcrumed on sleeve 40 and an arm 25c linked to arm 25b and mandrel 22.

In operation, the lower carrier ring 8 is first operatively aligned with core 28 to define a relatively shallow mold cavity 29 for the formation of the innermost layer of the tire body, i.e. its carcass. When the molding operation is completed, and before that layer has completely set, the mold is opened by the outward retraction of segments 16 through reverse energization of motor 10 whereupon motor 21 is energized to drive the unit 4 downwardly for juxtaposition of segments 15 with core 28. Next, ring 7 is rotated by the associated motor 10 to re-establish the mold cavity 29, now of greater depth, around the carcass layer for the purpose of molding a second layer constituting the tread of the tire; again, the cavity is closed by the clamping of cheeks 23, 24 against the core and the mold segments with aid of jack 26. After the second molding step, unclamping of the cheeks and outward retraction of the segments, a removal of superstructure 25, 26 or a lowering of post 27 with cheek 24 and core 28 will allow the withdrawal of upper cheek 23 to expose the molded tire body which, upon outward retraction of segments 15 and collapse or inward retraction of the inflated or segmented core 28, can be removed from the mold.

It will be evident that more than two sets of mold segments 15, 16 may be mounted on respective carrier rings 7, 8 in stacked relationship in order to form additional layers of the tire body, e.g. a reinforcing band between the carcass and the tread; see, in this connection, commonly owned U.S. application Ser. No. 569,159, filed 18 Apr. 1975. Moreover, the frame 1 need not be vertical but could be inclined or even horizontal. The parallelogrammatic linkages 30 connecting the mold segments with their carrier rings are advantageous by virtue of their simplicity but could be replaced by other types of couplings.

What is claimed is:

1. An apparatus for molding a pneumatic tire with a body formed from a plurality of coaxial annular layers of elastomeric material, comprising:

a frame;
a generally toroidal core on said frame centered on an axis;
a plurality of sets of mutually complementary ring segments with inner radii larger than the core radius, said inner radii being different for the several sets;
a plurality of carriers on said frame supporting the ring segments of respective sets with freedom of radial displacement, with reference to said axis, between an outwardly retracted position and a working position in which said segments complement one another to a continuous outer mold wall;
transport means coupled with said carriers for successively aligning the segments of sets with progressively larger inner radii with said core, the aligned segments in their working position defining with said core an annular mold cavity;
closure means on said frame positionable to seal said mold cavity against the outside preparatorily to admission of elastomeric material into said mold cavity; and
actuating means on said frame coupled with said ring segments for displacing same between said retracted and working positions thereof.

2. An apparatus as defined in claim 1 wherein said closure means comprises a pair of axially separated cheeks on opposite sides of said core and clamping means for relatively displacing said cheeks along said axis toward and away from said core and the aligned set of segments.

3. An apparatus as defined in claim 2 wherein said clamping means comprises a fluid-actuated jack.

4. An apparatus as defined in claim 2 wherein said cheeks are generally disk-shaped with peripheral portions overlying said segments in their working position but cleared by said segments in their retracted position, said carriers being axially shiftable by said transport means with reference to said cheeks and said core for displacing the retracted segments past said cheeks into and out of alignment with said core.

5. An apparatus as defined in claim 4 wherein said one of said cheeks is fixedly secured to said core and the other of said cheeks is axially movable with reference thereto, said segments being mounted on their carriers with limited axial mobility for centering themselves between said cheeks.

6. An apparatus as defined in claim 5, further comprising resilient means inserted between said core and other of said cheeks for tending to keep the latter spaced from said core.

7. An apparatus as defined in claim 1 wherein said carriers are mounting rings engaged by said actuating means for limited rotation about said axis, the segments of each set being provided with coupling means translating said limited rotation into a radial displacement of the segments.

8. An apparatus as defined in claim 7 wherein said coupling means comprises a parallelogrammatic linkage.

9. An apparatus as defined in claim 1 wherein said frame is upright, said carriers being vertically stacked on said frame.

10. An apparatus as defined in claim 1 wherein said transport means comprises a common support for said carriers and a plurality of synchronized leadscrews arrayed about said axis and engaging said support.

* * * * *